(12) United States Patent
Huang et al.

(10) Patent No.: US 10,114,343 B2
(45) Date of Patent: Oct. 30, 2018

(54) TOUCH DEVICE WITH TOUCH FUNCTION

(71) Applicants: INTERFACE OPTOELECTRONIC (SHENZHEN) CO., LTD., Shenzhen (CN); GENERAL INTERFACE SOLUTION LIMITED, Miaoli County (TW)

(72) Inventors: Chi-Hsien Huang, Hsinchu (TW); Chen-Hsing Huang, Hsinchu (TW); Yi-Fan Chang, Hsinchu (TW); Tsung-Ju Hu, Hsinchu (TW)

(73) Assignees: INTERFACE OPTOELECTRONIC (SHENZHEN) CO., LTD., Shenzhen (CN); GENERAL INTERFACE SOLUTION LIMITED, Zhubei (TW)

( * ) Notice: Subject to any disclaimer, the term of this patent is extended or adjusted under 35 U.S.C. 154(b) by 0 days.

(21) Appl. No.: 15/196,010

(22) Filed: Jun. 28, 2016

(65) Prior Publication Data
US 2017/0010726 A1    Jan. 12, 2017

(30) Foreign Application Priority Data

Jul. 6, 2015 (CN) .......................... 2015 1 0388486

(51) Int. Cl.
*G06F 3/041* (2006.01)
*G04G 21/08* (2010.01)

(52) U.S. Cl.
CPC ............. *G04G 21/08* (2013.01); *G06F 3/041* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2013/0135229 A1* | 5/2013 | Wang ................... | G06F 1/1643 345/173 |
| 2014/0062916 A1* | 3/2014 | Hong ..................... | G06F 3/041 345/173 |
| 2014/0132558 A1* | 5/2014 | Jang ....................... | G06F 3/044 345/174 |
| 2015/0241852 A1* | 8/2015 | Yang ..................... | G04G 17/08 368/223 |

* cited by examiner

*Primary Examiner* — Patrick Moon
(74) *Attorney, Agent, or Firm* — ScienBiziP, P.C.

(57) ABSTRACT

The present disclosure provides a touch device. The touch device includes a touch panel and an external circuit. The touch panel is configured to detect touch operations. The external circuit is configured to drive the touch panel. A plurality of connection structures extend from edges of the touch panel towards the external circuit. The plurality of connection structures are electrically conductive and are electrically coupled to the external circuit. The connection structures are configured to transmit touch signals from the touch panel to the external circuit.

10 Claims, 6 Drawing Sheets

TOUCH DEVICE WITH TOUCH FUNCTION

CROSS-REFERENCE TO RELATED APPLICATIONS

This application claims priority to Chinese Patent Application No. 201510388486.5 filed on Jul. 6, 2015 in the China Intellectual Property Office, the contents of which are incorporated by reference herein.

FIELD

The subject matter herein relates to touch devices with touch function.

BACKGROUND

Wearable touch device, such as a watch with touch function, may sense a touch operation applied on the watch. A low profile touch device commonly comprises a touch panel, an external circuit, and transmission element for transmitting signals between the touch panel and the external circuit. Research efforts have been devoted in an attempt to reduce a border width of the touch panel for high integration density and small size.

BRIEF DESCRIPTION OF THE DRAWINGS

Implementations of the present technology will now be described, by way of example only, with reference to the attached figures.

DETAILED DESCRIPTION

Figure 1:
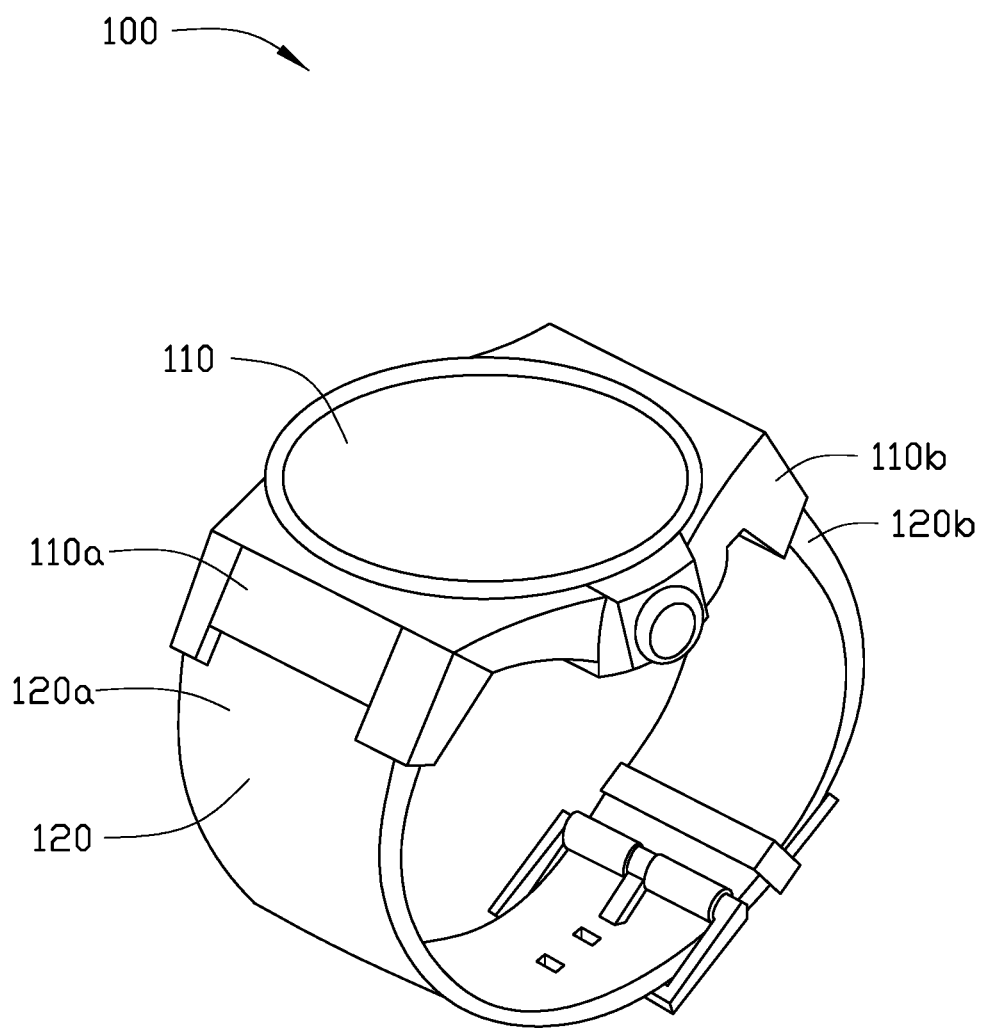
FIG. 1 is an isometric view of a first embodiment of a touch device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates a first embodiment of a touch device 100. In this embodiment, the touch device 100 is a watch with touch function. Referring to FIG. 1, the touch device 100 includes a main portion 110 and a watchband 120. The main portion 110 defines a first end 110a and a second end 110b opposite to the first end 110a. The watchband 120 defines a third end 120a and a fourth end 120b opposite to the third end 120a. The first end 110a is connected to the third end 120a. The second end 110b is connected to the fourth end 120b.

Figure 2:
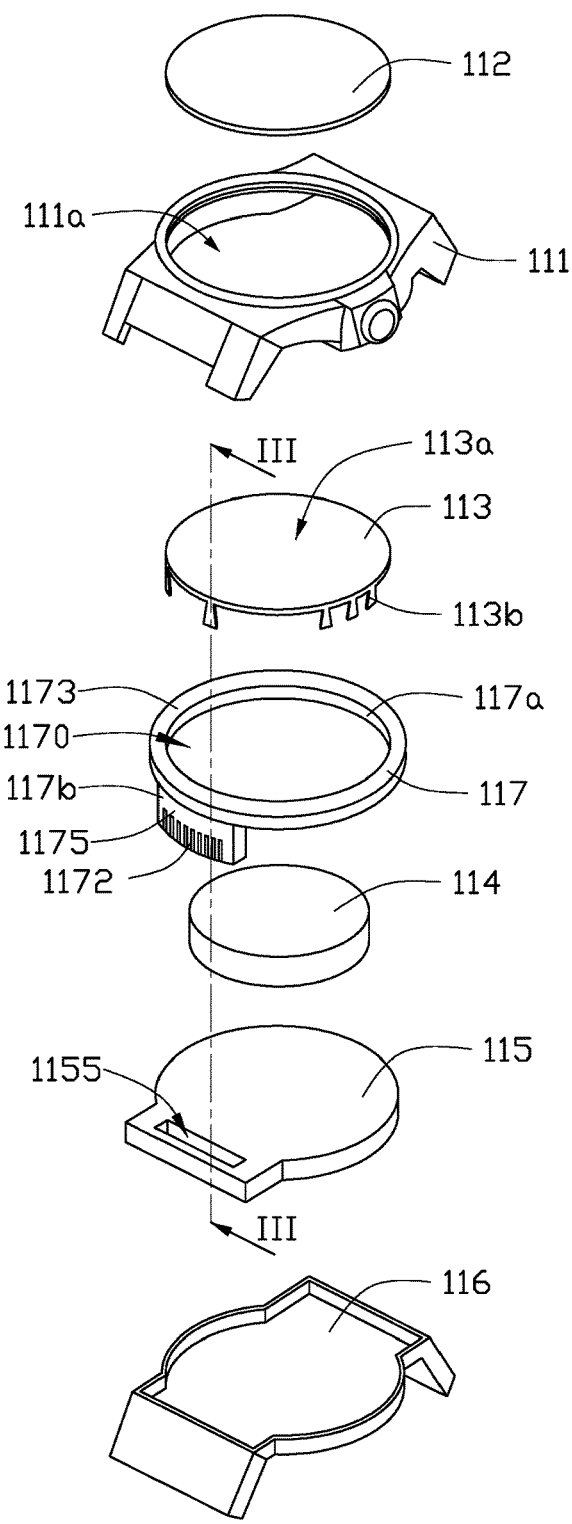
FIG. 2 is an exploded view of the touch device of FIG. 1.

FIG. 2 is an exploded view of the touch device 100. Referring to FIG. 2, the main portion 110 includes an upper case 111, a cover glass 112, a touch panel 113, a time display assembly 114, an external circuit 115, a lower case 116, and a transmission element 117. The upper case 111, the cover glass 112, and the lower case 116 are fixed together to cooperatively form a receiving space (not shown) for receiving the touch panel 113, the time display assembly 114, the external circuit 115, and the transmission element 117.

In this embodiment, the upper case 111 defines an opening 111a passing through the upper case 111. The cover glass 112 is mounted on the upper case 111 and covers the opening 111. The touch panel 113 is located at one side of the cover glass 112 adjacent to the lower case 116 and is aligned with the cover glass 112. The time display assembly 114 is located at one side of the touch panel 113 adjacent to the lower case 116. The external circuit 115 is sandwiched between the time display assembly 114 and the lower case 116. The touch panel 113, the time display assembly 114, and the external circuit 115 are stacked in order.

A surface of the cover glass 112 away from the lower case 116 defines a touch surface. The touch panel 113 is configured to detect a touch operation applied on the touch surface and produce electrical signals according the touch operation. The time display assembly 114 is configured to display a current time. In this embodiment, the time display assembly 114 includes an electronic display screen. The time display assembly 114 is further configured to display health information, music lists, pictures, and videos. The time display assembly 114 may be a liquid crystal display screen or an organic light emitting diode display screen. In other embodiments, the time display assembly 114 may include a mechanical watch module including hands and time scales. The external circuit 115 is configured to drive the touch panel 113, control the touch panel 113 to send touch signals, receive electrical signals from the touch panel 113, and etc. A shape of an inner surface of the lower case 116 is corresponding to a shape of the external circuit 115. The external circuit 115 is fixed on the inner surface of the lower case 116.

The touch panel 113 defines a touch area 113a. A plurality of connection structures 113b extend from edges of the touch panel 113 towards the external circuit 115. In this embodiment, the plurality of connection structures 113b is substantially perpendicular to the touch panel 113. The plurality of connection structures 113b are separated from each other. The connection structures 113b are configured to transmit touch signals from the touch panel 113 to the external circuit 115. Each connection structure 113b has an electrical conductor formed thereon.

Figure 3:
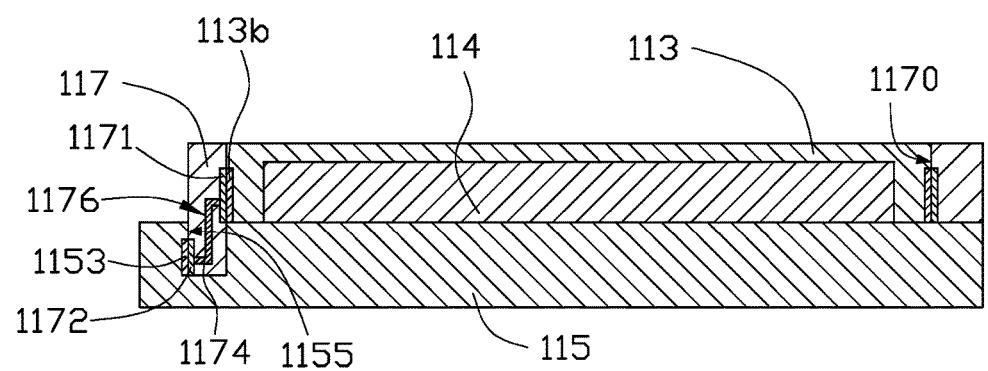
FIG. 3 is a cross-sectional view taken along line of FIG. 2.

FIG. 3 is a cross-sectional view taken along line of FIG. 2. Referring to FIG. 3, the connection structure 113b is electrically coupled to the transmission element 117. The transmission element 117 is electrically connected to the external circuit 115. Thus, the touch signals could be transmitted from the touch panel 113 to the external circuit 115. The transmission element 117 includes a ring portion 1173 defining a center hole 1170 and a extending portion 1175 extending from the ring portion 1173 (as shown in FIG. 2). The ring portion 1173 has a first surface 117a as wall of the center hole 1170. The extending portion 1175 extends along a direction substantially perpendicular to a plane defined by the ring portion 1173. The extending portion 1175 includes a second surface 117b away from the first surface 117a.

The touch panel 113 and the plurality of connection structures 113b are received in the center hole 1170, and the connection structures 113b contact the first surface 117a. The time display assembly 114 is also received in the center hole 1170, the connection structures 113b are positioned around the time display assembly 114.

The transmission element 117 further includes a plurality of first connection portions 1171 formed on the first surface 117a, a plurality of second connection portions 1172 formed on the second surface 117b, and a plurality of connection lines 1174 embedded in the transmission element 117 and electrically coupled the first connection portions 1171 to the second connection portions 1172. Each of the connection lines 1174 has one end electrically connected to a corresponding first connection portion 1171 and an opposite end electrically connected to a corresponding second connection portion 1172. A plurality of holes 1176 is defined in the transmission element 117 to receive the plurality of connection lines 1174. The first connection portions 1171, the second connection portions 1172, and the connection lines 1174 are electrically conductive. Both the ring portion 1173 and the extending portion 1175 are electrically insulative.

The external circuit 115 defines a groove 1155 (as shown in FIG. 2) corresponding to the extending portion 1175 to receive the extending portion 1175. A plurality of third connection portions 1153 are formed in the groove 1155 configured to electrically couple to the second connection portions 1172. The plurality of third connection portions 1153 are electrically coupled to the external circuit 115. The third connection portions 1153 are also electrically conductive.

In this embodiment, the connection structure 113b has a substantially trapezoid shape. A width of one side of each of the connection structure 113b adjacent to the touch area 113a is less than a width of one side of the connection structure 113b away from the touch area 113a. The connection structures 113b are positioned around the time display assembly 114. The transmission element 117 is positioned around the connection structures 113b. The connection structures 113b are sandwiched between the time display assembly 114 and the transmission element 117, and each connection structure 113b is in electrically contact with one of the first connection portion 1171. As thus, the connection structures 113b are electrically coupled to the external circuit 115.

As the connection structures 113b extend from edges of the touch panel 113 towards the external circuit 115, and the touch area 113a is not covered by the connection structures 113b. Thus, the effective area of the touch area 113a is increased. Further, a thickness of the touch panel 113 is reduced due to the connection structures 113b, and thus a size of the touch device 100 is also reduced. In addition, because a width of one side of each of the connection structures 113b adjacent to the touch area 113a is less than a width of one side of the connection structure 113b away from the touch area 113a, the connection structures 113b is not easy to be damaged when be bent.

Figure 4:
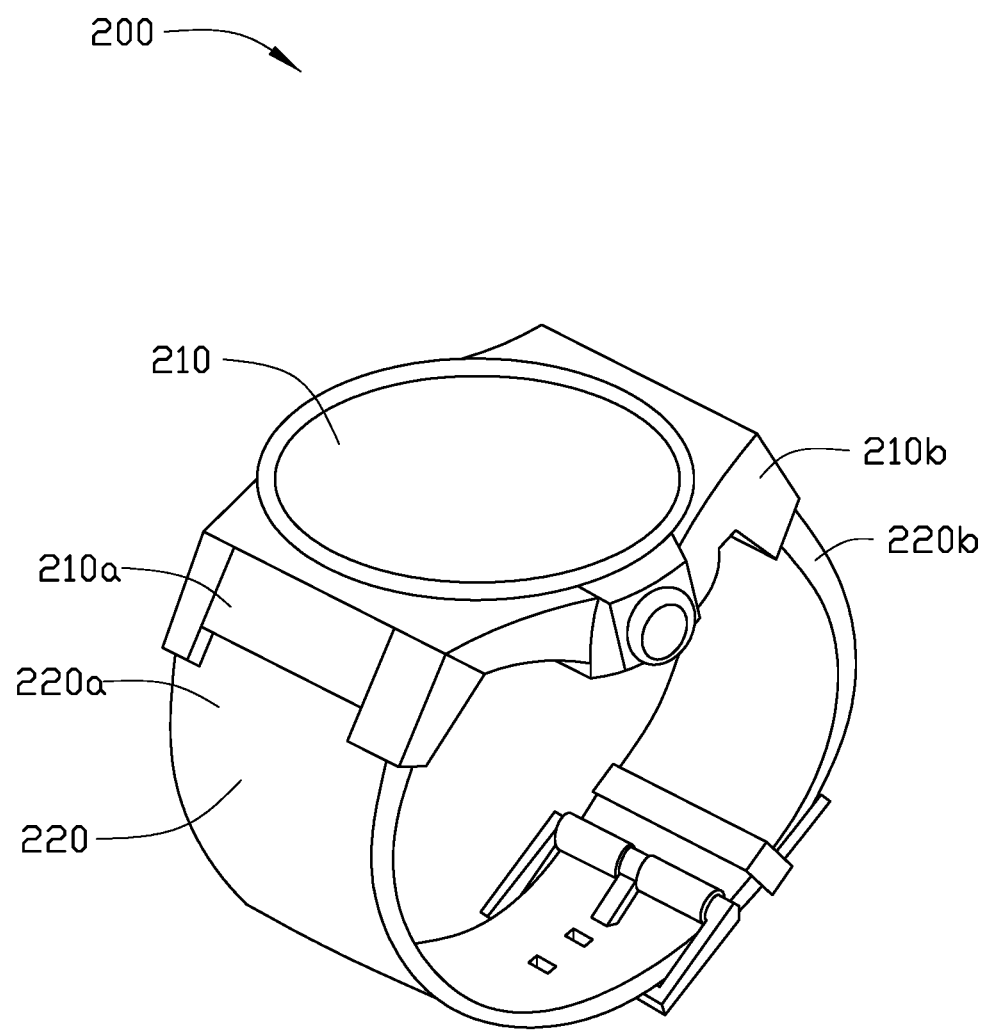
FIG. 4 is an isometric view diagram of a second embodiment of the touch device.

FIG. 4 illustrates a second embodiment of a touch device 200. In this embodiment, the touch device 200 is a watch with touch function. Referring to FIG. 4, the touch device 200 includes a main portion 210 and a watchband 220. The main portion 210 defines a first end 210a and a second end 210b opposite to the first end 210a. The watchband 220 defines a third end 220a and a fourth end 220b opposite to the third end 220a. The first end 210a is connected to the third end 220a. The second end 210b is connected to the fourth end 220b.

Figure 5:
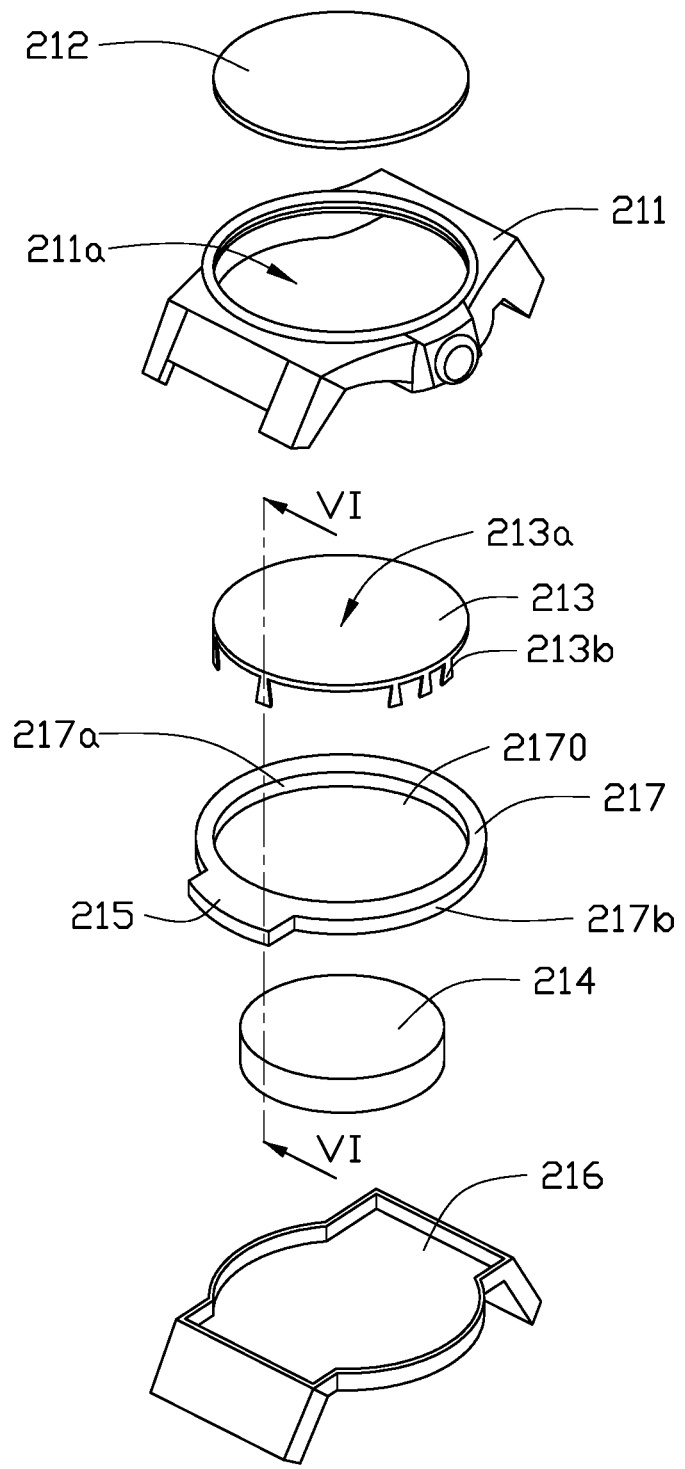
FIG. 5 is an exploded view of the touch device of FIG. 4.

FIG. 5 is an exploded view of the touch device 200. Referring to FIG. 2, the main portion 210 includes an upper case 211, a cover glass 212, a touch panel 213, a time display assembly 214, an external circuit 215, a lower case 216, and a transmission element 217. The upper case 211, the cover glass 212, and the lower case 216 are fixed together to cooperatively form a receiving space (not shown) for housing the touch panel 213, the time display assembly 214, the external circuit 215, and the transmission element 217.

In this embodiment, the upper case 211 defines an opening 211a passing through the upper case 211. The cover glass 212 is mounted on the upper case 211 and covers the opening 211a. The touch panel 213 is located at one side of the cover glass 212 adjacent to the lower case 216 and is aligned with the cover glass 212. The time display assembly 214 is located at one side of the touch panel 213 adjacent to the lower case 216.

A surface of the cover glass 212 away from the lower case 216 defines a touch surface. The touch panel 213 is configured to detect a touch operation applied on the touch surface and produce electrical signals according the touch operation. The time display assembly 214 is configured to display a current time. In this embodiment, the time display assembly 214 includes an electronic display screen. The time display assembly 214 is further configured to display health information, music lists, pictures, and videos. The time display assembly 214 may be a liquid crystal display screen or an organic light emitting diode display screen. In other embodiments, the time display assembly 214 may include a mechanical watch module including hands and time scales. The external circuit 215 is configured to drive the touch panel 213. The external circuit 115 is fixed on the inner surface of the lower case 116.

The touch panel 213 defines a touch area 213a. A plurality of connection structures 213b extend from edges of the touch panel 213 towards the lower case 216 and are substantially perpendicular to the touch panel 213. The plurality of connection structures 213b are separated from each other. The connection structures 213b are configured to transmit touch signals from the touch panel 213 to the external circuit 215. Each connection structure 213b has an electrical conductor formed thereon.

Figure 6:
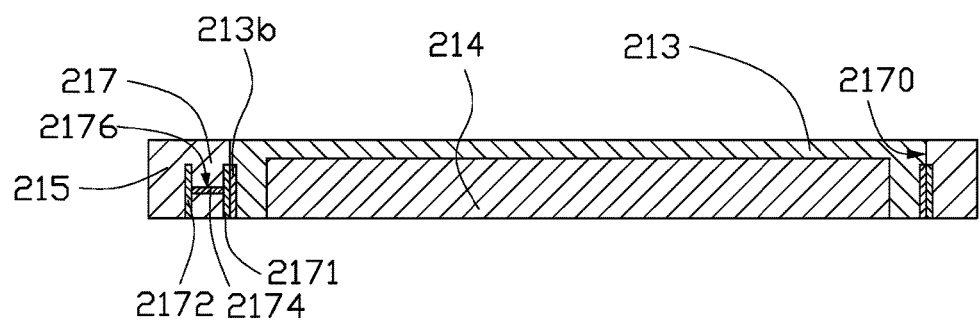
FIG. 6 is a cross-sectional view taken along line VI-VI of FIG. 5.

FIG. 6 is a cross-sectional view taken along line VI-VI of FIG. 5. Referring to FIG. 5 and FIG. 6, the connection structure 213b is electrically coupled to the transmission element 217. The transmission element 217 has a substantially ring shape and defines a center hole 2170. The transmission element 217 includes a first surface 217a as wall of the center hole 2170 and a second surface 217b away from the first surface 217a. In this embodiment, the external circuit 215 is integrated with the transmission element 217. The external circuit 215 is formed on the second surface 217b.

The touch panel 213 and the plurality of connection structures 213b are received in the center hole 2170, and the connection structures 213b contact the first surface 217a. The time display assembly 214 is also received in the center hole 1170, the connection structures 213b are positioned around the time display assembly 214.

A plurality of first connection portions 2171 (best shown in FIG. 6) are formed on the first surface 217a. Each of the connection structures 213b is electrically coupled to one corresponding first connection portion 2171. A plurality of second connection portions 2172 are formed between the external circuit 215 and the transmission element 217, and electrically coupled to the external circuit 215. A plurality of holes 2176 are defined in the transmission element 217. A plurality of connection lines 2174 are received in the holes 2176. The first connection portions 2171, the second connection portion 2172, and the connection lines 2174 are electrically conductive. Each connection line 2174 has one end electrically connected to a corresponding first connection portion 2171 and an opposite end electrically connected to a corresponding second connection portion 2172. Thus, the touch panel 213 is electrically connected to the transmission element 217, and the transmission element 217 is electrically connected to the external circuit 215, and the touch signals could be transmitted from the touch panel 213 to the external circuit 215.

In this embodiment, the connection structure 213b has a substantially trapezoid shape. A width of one side of each of the connection structure 213b adjacent to the touch area 213a is less than a width of one side of the connection structure 213b away from the touch area 213a. The connection structures 213b are positioned around the time display assembly 214. The transmission element 217 is positioned around the connection structures 213b. The connection structures 213b are sandwiched between the time display assembly 214 and the transmission element 217, and each connection structure 213b is in electrically contact with one of the first connection portion 2171. As the external circuit 215 is integrated with the transmission element 217, a size of the touch device 200 can be effectively reduced.

The embodiments shown and described above are only examples. Many details are often found in the art such as the other features of a touch device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A touch device, comprising:
a touch panel defining a touch area;
an external circuit configured to drive the touch panel;
a plurality of connection structures extending perpendicularly from edges of the touch panel, the plurality of connection structures being configured to transmit touch signals from the touch panel to the external circuit; and
a transmission element receiving the touch panel and the plurality of connection structures, the transmission element being electrically coupled the plurality of connection structures to the external circuit, the transmission element being configured to transmit signals between the touch panel and the external circuit;
wherein the transmission element comprises:
a plurality of first connection portions electrically coupled to the connection structures;
a plurality of second connection portions electrically coupled to the external circuit; and
a plurality of connection lines configured to electrically coupled the plurality of first connection portions to the plurality of second connection portions;
wherein the first connection portions, the second connection portion, and the connection lines are electrically conductive; and
wherein the transmission element further comprises a ring portion defining a center hole and a extending portion extending from the ring portion, the ring portion has a first surface forming wall of the center hole, the extending portion has a second surface away from the first surface, the plurality of first connection portions are disposed on the first surface, the plurality of second connection portions are disposed on the second surface, the plurality of connection lines are embedded in the transmission element.

2. The touch device of claim 1, wherein the touch panel and the plurality of connection structures are received in the center hole; and the connection structures contact the first surface.

3. The touch device of claim 2, wherein the touch device further comprises a time display assembly, the time display assembly is received in the center hole, and the connection structures are positioned around the time display assembly.

4. The touch device of claim 1, wherein the external circuit defines a groove to receive the extending portion, a plurality of third connection portions are formed in the groove and are electrically coupled to the second connection portions.

5. The touch device of claim 1, wherein a width of one side of each of the connection structure adjacent to the touch area is less than a width of one side of the connection structure away from the touch area.

6. The touch device of claim 5, wherein each of the connection structures has a trapezoid shape.

7. The touch device of claim 1, wherein the touch device further comprises an upper case, a cover glass, and a lower case; the upper case, the cover glass, and the lower case are fixed together to cooperatively form a receiving space for receiving the touch panel, the external circuit, and the transmission element.

8. The touch device of claim 7, wherein the upper case defines an opening passing through the upper case; the cover glass is mounted on the upper case and covers the opening; the touch panel is located at one side of the cover glass adjacent to the lower case and is aligned with the cover glass.

9. The touch device of claim 5, wherein the upper case, the cover glass, and the lower case cooperatively defines a main portion having a first end and a second end opposite to the first end; the touch device further comprises a watchband connected the first end and the second end.

10. The touch device of claim 9, wherein the touch device is a watch.

* * * * *